United States Patent Office 3,629,376
Patented Dec. 21, 1971

3,629,376
S-CARBOETHOXYMETHYL-S-S-DIALKYL-TRITHIOPHOSPHATES
Erik K. Regel, Mission, Kans., and Marion F. Botts, Independence, Mo., assignors to Chemagro Corporation, Kansas City, Mo.
No Drawing. Original application May 26, 1967, Ser. No. 641,453, now Patent No. 3,502,771, dated Mar. 24, 1970. Divided and this application July 3, 1969, Ser. No. 870,974
Int. Cl. A01n 9/36; C07f 9/08
U.S. Cl. 260—941
3 Claims

ABSTRACT OF THE DISCLOSURE

Compounds are prepared having the formula

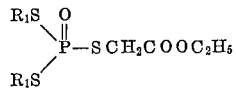

where $R_1$ and $R_2$ are alkyl of 2 to 4 carbon atoms. The compounds are useful in killing fungi.

---

The present invention relates to the preparation of novel trithiophosphates and their uses.

It is an object of the present invention to prepare novel trithiophosphates.

Another object is to prepare novel soil fungicide compositions.

This application is a division of my copending application, Ser. No. 641,453, filed May 26, 1967, now Pat. 3,502,771.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

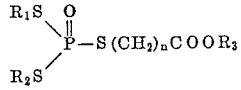

where $R_1$, $R_2$ and $R_3$ are alkyl of 1 to 8 carbon atoms (preferably not over 6 carbon atoms) and $n$ is an integer of 1 to 3 carbon atoms. Preferably $R_1$ and $R_2$ are 2 to 4 carbon atoms, $R_3$ is 2 carbon atoms and $n$ is 1.

The S - carboalkoxyalkyl - S-S-dialkyltrithiophosphates have good soil fungicidal activity. This is surprising since usually trithiophosphates do not possess substantial activity against pythium irregulare and other pythium species. Also surprising S-carboethoxymethyl-S-S-dimethyl trithiophosphate possesses only little soil fungicide activity whereas S-carboethoxymethyl-S-S-diethyl trithiophosphate has very high soil fungicide activity. The corresponding S,S-dipropyl and S,S-dibutyl homologues show more soil fungicidal activity than the S,S-dimethyl compound. The compounds of the present invention can be prepared by the following series of reactions.

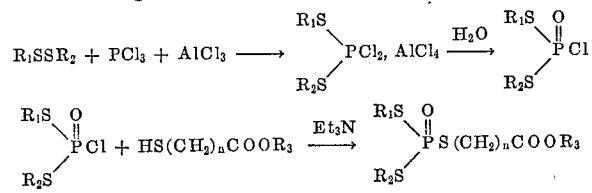

While usually the compound $R_1SSR_2$ will be symmetrical, e.g. dimethyl disulfide, diethyl disulfide, dipropyl disulfide, dibutyl disulfide, diamyl disulfide, dihexyl disulfide, dioctyl disulfide, diisoamyl disulfide, diisobutyl disulfide, diisopropyl disulfide, di tert. butyl disulfide, di sec. butyl disulfide or the like, if mixed esters are desired as the final product then there will be employed mixed disulfides as the starting materials, e.g. ethyl propyl disulfide, methyl ethyl disulfide, ethyl butyl disulfide and the like.

The intermediate S,S-dialkyl dithiophosphoryl chlorides are now readily available, e.g. see Regel Patent 3,193,372.

As mercaptoalkanoates there can be used alkyl thioglycolates (alkyl esters of thioacetic acid), alkyl beta thiopropionates and alkyl gamma thiobutyrates such as methyl thioglycolate ($HSCH_2COOCH_3$), ethyl thioglycolate, propyl thioglycolate, isopropyl thioglycolate, butyl thioglycolate, isobutyl thioglycolate, sec. butyl thioglycolate, tert. butyl thioglycolate, amyl thioglycolate, hexyl thioglycolate, octyl thioglycolate, 2-ethylhexyl thioglycolate, isooctyl thioglycolate, methyl beta thiopropionate, ethyl beta thiopropionate, propyl beta thiopropionate, butyl beta thiopropionate, amyl beta thiopropionate, ethyl gamma thiobutyrate, methyl gamma thiobutyrate, propyl gamma thiobutyrate and butyl gamma thiobutyrate.

While triethylamine is the preferred basic material to bind the HCl formed in the fiinal reaction there can be used other basic materials such as sodium hydroxide, potassium hydroxide, sodium carbonate, tripropylamine, N,N-dimethylaniline, trimethylamine, anion exchange resins, etc.

Compounds within the present invention include

S-carboethoxymethyl-S,S-dimethyl trithiophosphate,
S-carboethoxymethyl-S,S-diethyl trithiophosphate,
S-carboethoxymethyl-S,S-dipropyl trithiophosphate,
S-carboethoxymethyl-S,S-dibutyl trithiophosphate,
S-carboethoxymethyl-S,S-diamyl trithiophosphate,
S-carboethoxymethyl-S,S-dihexyl trithiophosphate,
S-carboethoxymethyl-S,S-dioctyl trithiophosphate,
S-carboethoxymethyl-S,S-diisopropyl trithiophosphate,
S-carboethoxymethyl-S,S-diisobutyl trithiophosphate,
S-carboethoxymethyl-S,S-di sec. butyl trithiophosphate,
S-carboethoxymethyl-S,S-di tert. butyl trithiophosphate,
S-carboethoxymethyl-S,S-diisoamyl trithiophosphate,
S-carboethoxymethyl-S-ethyl-S-propyl trithiophosphate,
S-carbomethoxymethyl-S,S-dimethyl trithiophosphate,
S-carbomethoxymethyl-S,S-diethyl trithiophosphate,
S-carbomethoxymethyl-S,S-dipropyl trithiophosphate,
S-carbomethoxymethyl-S,S-dibutyl trithiophosphate,
S-carbopropoxymethyl-S,S-diethyl trithiophosphate,
S-carbopropoxymethyl-S,S-dipropyl trithiophosphate,
S-carbobutoxymethyl-S,S-dimethyl trithiophosphate,
S-carbobutoxymethyl-S,S-diethyl trithiophosphate,
S-carbobutoxymethyl-S,S-dibutyl trithiophosphate,
S-carbohexoxymethyl-S,S-diethyl trithiophosphate,
S-carbooctoxymethyl-S,S-diethyl trithiophosphate,
S-carboethoxyethyl-S,S-dimethyl trithiophosphate,
S-carboethoxyethyl-S,S-dipropyl trithiophosphate,
S-carboethoxyethyl-S,S-dibutyl trithiophosphate,
S-carboethoxyethyl-S,S-diamyl trithiophosphate,
S-carbomethoxyethyl-S,S-dipropyl trithiophosphate,
S-carbopropoxyethyl-S,S-diethyl trithiophosphate,
S-carbobutoxyethyl-S,S-dibutyl trithiophosphate,
S-carbobutoxyethyl-S,S-diethyl trithiophosphate,
S-carbomethoxypropyl-S,S-diethyl trithiophosphate,
S-carboethoxypropyl-S,S-diethyl trithiophosphate,
S-carboethoxypropyl-S,S-dipropyl trithiophosphate,
S-carbopropoxypropyl-S,S-diethyl trithiophosphate.

As indicated the compounds of the present invention have soil fungicide activity, e.g. against pythium. They also have some nematocidal and defoliation activity but the latter activities are not sufficient to appear to be commercially attractive.

Unless otherwise indicated all parts and percentages are by weight.

EXAMPLE 1

13.3 grams (0.1 mole) aluminum trichloride was suspended in 13.7 grams (0.1 mole) of phosphorus trichloride and cooled to 0° C. 9.4 grams (0.1 mole) dimethyl disulfide ($CH_3SSCH_3$) was then added dropwise to this stirring mixture. The resulting "complex" was stirred for 1 hour at ambient temperature. The "complex" was then poured onto 100 grams of cracked ice and 25 ml. of concentrated hydrochloric acid added. The product was extracted with methylene dichloride, the methylene dichloride was further extracted with two 100 ml. portions of 5% hydrochloric acid and the methylene dichloride layer was then dried immediately over anhydrous sodium sulfate. The solvent was stripped in vacuo on a steam bath to obtain crude S,S-dimethyl dithiophosphoryl chloride which was then purified by distillation, B.P.$_{0.04}$ 74° C., $n_D^{23}$ 1.5780, yield 60%.

EXAMPLE 2

The procedure of Example 1 was repeated using 12.2 grams (0.1 mole) of diethyl disulfide in place of the dimethyl disulfide to produce S,S-diethyl dithiophosphoryl chloride, B.P.$_{0.03}$ 80° C., $n_D^{22}$ 1.5485, yield 70%.

EXAMPLE 3

The procedure of Example 1 was repeated using 15 grams (0.1 mole) of dipropyl disulfide in place of the dimethyl disulfide to produce S,S-dipropyl dithiophosphoryl chloride, B.P.$_{0.05}$ 103° C., $n_D^{24}$ 1.5324, yield 60%.

EXAMPLE 4

The procedure of Example 1 was repeated using 17.9 grams (0.1 mole) of dibutyl disulfide in place of the dimethyl disulfide to produce S,S-dibutyl dithiophosphoryl chloride, B.P.$_{0.05}$ 105° C., $n_D^{25}$ 1.5210, yield 74%.

EXAMPLE 5

17.7 grams (0.1 mole) of S,S-dimethyl dithiophosphoryl chloride was dissolved in 100 ml. of benzene and mixed with 12.0 grams (0.1 mole) of ethyl thioglycolate ($HSCH_2COOC_2H_5$). Then 10.1 grams (0.1 mole) of triethylamine was added dropwise to the stirring reaction mixture. The reaction mixture was maintained at 20–25° C. with an ice bath. After addition of the triethylamine was completed, the reaction mixture was allowed to stir for 2 hours at ambient temperature. The reaction mixture was then washed successively with cold water and 10% sodium bicarbonate solution. The benzene layer was then dried over anhydrous sodium sulfate and the solvent removed in vacuo on a steam bath. The product was purified by distillation to give S-carboethoxymethyl-S,S-dimethyl trithiophosphate, B.P.$_{0.02}$ 135° C.; $n_D^{23}$ 1.5685, yield 77%.

EXAMPLE 6

The procedure of Example 5 was repeated using 20.5 grams (0.1 mole) of S,S-diethyl dithiophosphoryl chloride in place of the S,S-dimethyl dithiophosphoryl chloride to produce S-carboethoxymethyl-S,S-diethyl trithiophosphate (Compound R–7091), B.P.$_{0.15}$ 143° C., $n_D^{20}$ 1.5525, yield 80%.

EXAMPLE 7

The procedure of Example 5 was repeated using 23.6 grams (0.1 mole) of S,S-dipropyl dithiophosphoryl chloride in place of the S,S-dimethyl dithiophosphoryl chloride to produce S-carboethoxymethyl-S,S-dipropyl trithiophosphate (Compound R–7097), B.P.$_{0.01}$ 146° C., $n_D^{25}$ 1.5395, yield 87.5%.

EXAMPLE 8

The procedure of Example 5 was repeated using 26.0 grams (0.1 mole) of S,S-dibutyl dithiophosphoryl chloride in place of the S,S-dimethyl dithiophosphoryl chloride to produce S-carboethoxymethyl-S,S-dibutyl trithiophosphate (Compound R–7092), B.P.$_{0.03}$ 150° C., $n_D^{26}$ 1.5285, yield 85%.

The compounds of the present invention can be used alone as fungicides but it has been found desirable to apply them to the pest, e.g. to the soil habitat of the fungi, together with inert solids to form dusts, or suspended in a suitable liquid diluent, e.g. water. They can be applied at widely varying rates, e.g. 0.1–30 lbs./acre.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate, and butyl acetate, ethers, e.g., ethylene glycol monomethyl ether and diethylene glycol monomethyl ether, alcohols, e.g. ethanol, methanol, isopropanol, amyl alcohol, ethylene glycol, propylene glycol, butyl Carbitol acetate and glycerine. Mixtures of water and organic solvents, either as solutions or emulsions, can be employed.

The novel pesticides can also be applied as an aerosol, e.g., by dispersing them in air by means of a compressed gas such as dichlorodifluoromethane or trichlorofluoromethane and other Freons, for example.

The pesticide of the present invention can also be applied with fungicidal adjuvants or carries such as talc, pyrophylite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl groups, alkylphenyl ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids, and rosin acids, e.g., Ethofat 17 and 13, sodium N-methyl-N-oleylaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate, sorbitan tris (polyoxyalkylene) monolaurate (Tween 20).

The solid and liquid formulations can be prepared by any of the conventional procedures. Thus, the active ingredient can be mixed with the solid carrier in finely divided form in amounts small enough to preserve the free-flowing property of the final dust composition.

The compounds of the present invention are useful as soil fungicides, seed protectants, seed disinfectants, foliar fungicides and in other fungicidal applications.

In the following examples illustrating fungicidal activity the trithiophosphates were formulated as wettable powders consisting of 50% of the trithiophosphate, 46% ultra-fine silica, 2% sodium lignin sulfonate and 2% Pluronic L-61 (polyethylene oxide-polypropylene oxide adduct molecular weight about 1000). This wettable powder is hereinafter designated as Formulation A.

EXAMPLE 9

Formulation A was added to soil infested with pythium irregulare and pea seeds planted in the soil. The results are shown in Table 1 where the results are expressed on a 0–10 scale where 0 indicates 100% infection and 10 indicated no infection. In the dosages the term "AI" indicates "active ingredient," i.e. the trithiophosphate.

TABLE 1

| Compound | 200 lbs. AI/acre | 50 lbs. AI/acre |
|---|---|---|
| 7091 | 8 | 7 |
| 7097 | 6 | 6 |
| 7092 | 6 | 6 |

EXAMPLE 10

The test with pythium infested soil described in Example 9 was repeated with pea seeds and extended to lower rates of active ingredient as shown in Table 2.

TABLE 2

| Compound | 50 lbs. AI/acre | 25 lbs. AI/acre | 12.5 lbs. AI/acre |
|---|---|---|---|
| 7091 | 7 | 7 | 7 |
| 7097 | 7 | 7 | 7 |
| 7092 | 4 | 3 | 3 |

EXAMPLE 11

Greenhouse tests of Formulation A were carried out with pea seeds planted in soil infested with pythium irregulare. The results are set forth in Table 3. The parts per million (p.p.m.) are for the active ingredient, i.e. the trithiophosphate.

TABLE 3

| Compound | 100 p.p.m. | 50 p.p.m. | 25 p.p.m. | 12 p.p.m. | 6 p.p.m. |
|---|---|---|---|---|---|
| 7091 | 7.4 | 7.9 | 7.1 | 3.6 | 4.0 |
| 7097 | 2.3 | 4.2 | 4.9 | 4.9 | 4.8 |
| 7092 | 2.1 | 4.1 | 3.3 | 3.0 | 3.0 |

What is claimed is:

1. A compound having the formula

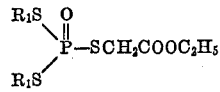

where $R_1$ and $R_2$ are alkyl of 2 to 4 carbon atoms.

2. A compound according to claim 1 which is S-carboethoxymethyl-S,S-diethyltrithiophosphate.

3. A compound according to claim 1 which is S-carboethoxymethyl-S,S-dipropyltrithiophosphate.

References Cited

FOREIGN PATENTS 1,450,599  7/1966  France  260—941

CHARLES B. PARKER, Primary Examiner

R. L. RAYMOND, Assistant Examiner

U.S. Cl. X.R.

424—212